United States Patent
Qi et al.

(10) Patent No.: US 9,681,476 B2
(45) Date of Patent: Jun. 13, 2017

(54) WIRELESS COMMUNICATION DEVICES AND METHODS FOR FORMING PEER-TO-PEER (P2P) WIRELESS CONNECTIONS BETWEEN DEVICES

(75) Inventors: Emily H. Qi, Portland, OR (US); Marc Meylemans, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 184 days.

(21) Appl. No.: 13/997,051

(22) PCT Filed: Dec. 20, 2011

(86) PCT No.: PCT/US2011/066219
§ 371 (c)(1),
(2), (4) Date: May 9, 2014

(87) PCT Pub. No.: WO2013/095394
PCT Pub. Date: Jun. 27, 2013

(65) Prior Publication Data
US 2015/0117318 A1    Apr. 30, 2015

(51) Int. Cl.
*H04W 76/02*    (2009.01)
*H04L 29/08*    (2006.01)

(52) U.S. Cl.
CPC ....... *H04W 76/023* (2013.01); *H04W 76/027* (2013.01); *H04L 67/1051* (2013.01)

(58) Field of Classification Search
CPC .............. H04W 76/023; H04W 76/027; H04L 67/1051; H04L 67/1053; H04L 67/1055;
(Continued)

(56) References Cited

U.S. PATENT DOCUMENTS 7,466,810 B1 * 12/2008 Quon ................ H04M 3/42229
379/201.01
8,954,502 B1 * 2/2015 Kopikare ................ H04L 67/32
709/204

(Continued)

FOREIGN PATENT DOCUMENTS

CN    104221467 A    12/2014
EP    2795993 A1    10/2014
(Continued)

OTHER PUBLICATIONS

"International Application Serial No. PCT/US2011/066219, Search Report mailed Aug. 30, 2012", 3 pgs.
(Continued)

*Primary Examiner* — Jeffrey M Rutkowski
*Assistant Examiner* — Shah Rahman
(74) *Attorney, Agent, or Firm* — Schwegman Lundberg & Woessner, P.A.

(57) ABSTRACT

Various embodiments include an apparatus having a wireless communication device (WCD) and methods for the WCD to wirelessly exchange messages with other devices. In some embodiments, such a WCD may send a message to reject an invitation to form a peer-to-peer (P2P) wireless connection between the WCD and a first device if the invitation is received by the WCD when the WCD has already established a P2P wireless connection with a second device. Other embodiments including additional apparatus and methods are described.

21 Claims, 4 Drawing Sheets

(58) Field of Classification Search
CPC . H04L 67/1066; H04L 67/141; H04L 67/143; H04L 92/18
USPC .......................................................... 370/329
See application file for complete search history.

(56) References Cited

U.S. PATENT DOCUMENTS

| | | | |
|---|---|---|---|
| 9,036,169 B2* | 5/2015 | Park ...................... | G06F 3/1296 358/1.13 |
| 2006/0173940 A1 | 8/2006 | Guntupalli et al. | |
| 2009/0017857 A1* | 1/2009 | Kwon .................. | H04W 76/046 455/519 |
| 2009/0113059 A1 | 4/2009 | Logalbo et al. | |
| 2010/0238952 A1* | 9/2010 | Peng ................... | H04L 43/0882 370/468 |
| 2010/0272083 A1* | 10/2010 | Itoh ....................... | H04W 24/02 370/338 |
| 2011/0078312 A1 | 3/2011 | Rimac et al. | |
| 2011/0082939 A1* | 4/2011 | Montemurro ....... | H04W 76/023 709/227 |
| 2011/0082940 A1* | 4/2011 | Montemurro ........... | H04L 69/24 709/227 |
| 2011/0154039 A1* | 6/2011 | Liu ..................... | H04L 63/0869 713/170 |
| 2011/0252146 A1* | 10/2011 | Santamaria ......... | H04M 7/0057 709/227 |
| 2011/0258318 A1* | 10/2011 | Peng ..................... | H04L 47/781 709/226 |
| 2012/0265913 A1* | 10/2012 | Suumaki ............... | H04W 4/008 710/303 |
| 2012/0290730 A1* | 11/2012 | Desai .................... | H04L 67/104 709/228 |
| 2015/0009981 A1* | 1/2015 | Choi ................... | H04W 76/023 370/338 |

FOREIGN PATENT DOCUMENTS

| | | |
|---|---|---|
| KR | 102011004002 A | 4/2011 |
| WO | WO-2006067683 A2 | 6/2006 |
| WO | WO-2013095394 A1 | 6/2013 |

OTHER PUBLICATIONS

"International Application Serial No. PCT/US2011/066219, Written Opinion mailed Aug. 30, 2012", 4 pgs.
"European Application Serial No. 11877889.3, Extended European Search Report mailed Nov. 18, 2015", 6 pgs.
"International Application Serial No. PCT/US2011/066219, International Preliminary Report on Patentability mailed Jul. 3, 2014", 6 pgs.

* cited by examiner

WIRELESS COMMUNICATION DEVICES AND METHODS FOR FORMING PEER-TO-PEER (P2P) WIRELESS CONNECTIONS BETWEEN DEVICES

PRIORITY APPLICATION

This application is a U.S. National Stage Application under 35 U.S.C. 371 from International Application No. PCT/US2011/066219, filed Dec. 20, 2011, which is hereby incorporated by reference in its entirety.

FIELD

Embodiments described herein relate to wireless communications. Some embodiments relate to P2P wireless connections between devices.

BACKGROUND

Some electronic products, such as some computers, televisions, and mobile phones, may have a capability to form a wireless connection directly to each other in order to communicate with each other through the wireless connection without going through an intermediate component, such as an access point (e.g., a wireless communication router). In some situations, such a wireless connection between the devices may be formed at one time, but the same wireless connection may fail to form again at another time without additional actions, such as interactions by the users of these electronic products.

DETAILED DESCRIPTION

Figure 1A:
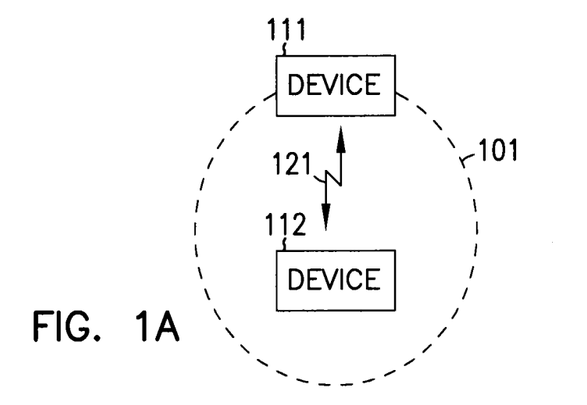
FIG. 1A shows a block diagram of devices wirelessly connected to each other in a wireless network, according to some embodiments described herein.

FIG. 1A shows a block diagram of devices 111 and 112 wirelessly connected to each other in a wireless network 101. Wireless network 101 may include a connection 121 (e.g., wireless connection) to enable devices 111 and 112 to directly communicate (e.g., directly and wirelessly exchange messages) with each other through connection 121. Devices 111 and 112 may include or be included in computers (e.g., desktops, laptops, and tablets), televisions, digital cameras, monitors, printers, cellular phones, gaming devices, and other electronic devices or systems.

Wireless network 101 may include a P2P wireless network, such that connection 121 may include a P2P wireless connection connecting devices 111 and 112 directly to each other. As shown in FIG. 1A, devices 111 and 112 may be wirelessly connected to each other without going through an intermediate component, such as an access point (e.g., a wireless communication router). When devices 111 and 112 are deemed to be wirelessly connected to each other, an association (e.g., a connection, such as connection 121) is established between devices 111 and 112 to enable them to recognize each other and share the same configuration parameters. Such parameters (e.g., provisioning parameters) may include a service set identifier (SSID), a basic service set identifier (BSSID), a pre-shared key (PSK), and a channel. Devices 111 and 112 may use some or all of these parameters in a provisioning process when they form connection 121 in wireless network 101.

Devices 111 and 112 may wirelessly exchange messages (e.g., data or other information) with each other through connection 121 according to a communication protocol (e.g., specification). For example, wireless network 101 may include a P2P wireless network, such that devices 111 and 112 may include wireless fidelity (Wi-Fi) enabled devices and may exchange messages with each other according to IEEE 802.11 standards. An example of a P2P wireless network includes a Wi-Fi Direct (also referred to as Wi-Fi peer-to-peer) network, developed and certified by the Wi-Fi Alliance. Thus, wireless network 101 formed by devices 111 and 112 may include a Wi-Fi Direct network, such that devices 111 and 112 may exchange messages with each other according to the Wi-Fi Direct specification. Wireless network 101 may include other P2P wireless networks.

FIG. 1A shows an example of a group including only two devices (e.g., devices 111 and 112) wirelessly connected to each other in a group (e.g., a P2P group) in wireless network 101. The number of devices in the group may be greater than two.

In wireless network 101, one of devices 111 and 112 in the group may act as controller (e.g., group owner, server, or the like) with a controller role (e.g., group owner role) to create the P2P group in wireless network 101. The other device may act as a client (e.g., a station, a mobile station, or the like). The controller in the P2P group may be an entry point to join the P2P group (e.g., an access point (AP), such as a software-based AP (SoftAP)). The controller may allow other devices to join the P2P group in the wireless network 101 as clients.

In FIG. 1A, device 111 may be a controller and device 112 may be a client. Alternatively, device 112 may be the controller and device 111 may be the client. Thus, each of devices 111 and 112 may include both controller functionality and client functionality and may support different modes (e.g., a controller mode and a client mode). Each of devices 111 and 112 may operate as either a controller (e.g., in a controller mode) or a client (e.g., in a client mode) at a given time.

The controller role in wireless network 101 may be determined at the beginning of a communication between devices 111 and 112 when they start (e.g., invite each other)

to form wireless network 101. For example, upon forming wireless network 101, devices 111 and 112 may negotiate with each other to determine which of the devices will be the controller of wireless network 101. After one of the devices (e.g., device 111) is determined to be the controller, the other device (e.g., device 112) may act as client and join wireless network 101. Determining which device is most appropriate to be the controller in wireless network 101 may depend on factors such as a power management capability of the device, number of connections supported by the device, a user interface, and services being offered by the device.

Figure 1B:
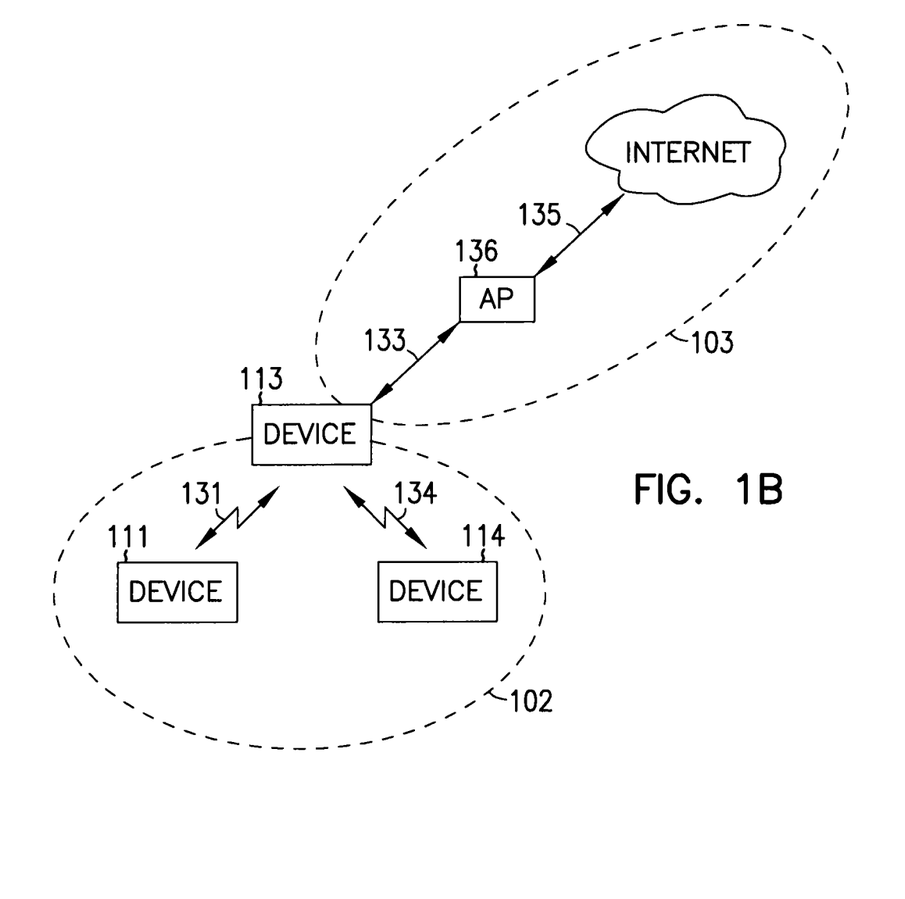
FIG. 1B shows a block diagram of devices wirelessly connected to each other in a network and connected to the Internet in another network, according to some embodiments described herein.

FIG. 1B shows a block diagram of devices 111, 113, and 114 wirelessly connected to each other in a network 102 and connected to the Internet in a network 103. Wireless network 102 may include connections 131 and 134 (e.g., P2P wireless connections) to enable devices 111, 113, and 114 to communicate with each other. Network 103 may include connections 133 and 135 and an AP 136 to enable device 113 to connect to the internet. Each of connections 133 and 135 may be either a wired or a wireless connection. Devices 111 and 114 may connect to the Internet through device 113. Wireless network 102 may be a secured wireless network and may operate in a security domain separate (e.g., different) from that of network 103.

Network 103 may include an infrastructure-based wireless local area network (WLAN). For example, AP 136 in network 103 may include a wireless communication router to exchange messages with device 113 according to IEEE 802.11 standards. In network 103, device 113 may be client (e.g., a regular station (STA)).

Wireless network 102 may correspond to wireless network 101 (FIG. 1A). For example, wireless network 102 may include a P2P wireless network (e.g., a Wi-Fi Direct network). Devices 111, 113, and 114 may include Wi-Fi enabled devices to wirelessly exchange messages with each other according to IEEE 802.11 standards. In FIG. 1B, device 113 may be the controller and devices 111 and 114 may be clients.

As shown in FIG. 1B, device 111 may have no P2P wireless connection with another device besides device 113. Device 111, however, may have a P2P wireless connection with another device in another group (e.g., another P2P group) before device 111 joins the group including devices 111, 113, and 114 in wireless network 102 as a client. For example, before joining wireless network 102 as a client, device 111 may have a P2P wireless connection (e.g., connection 121 in FIG. 1A) in a P2P group with another device (e.g., device 112 in FIG. 1A) where device 111 may be controller in such a P2P group. Thus, in FIG. 1B, device 111 may have left a previously formed P2P group (e.g., a persistent group including device 111 and 112 in FIG. 1A) in a wireless network (e.g., wireless network 101 in FIG. 1A) different from wireless network 102.

In wireless network 102, if a device supports only one interface (either physical or virtual), then that device may not be a client in one group concurrently with being a controller in another group. For example, if device 111 supports only one interface and if device 111 is already a client (as shown in the example of FIG. 1B) in the group including devices 111, 113 and 114, then device 111 may not be a controller in another group including device 111 and another device (different from device 113 or 114).

In wireless network 102, if a client is invited by a particular device to form (e.g., reform) a P2P wireless connection between that client and the particular device, and if that client has no available interface (e.g., extra virtual interface) to form such a wireless connection, then that client may dynamically switch from a client role to a controller role and form a new group including that client and the particular device. The particular device may include a device that previously has a P2P wireless connection with that client (e.g., in a persistent group). For example, in network 102, if device 111 is invited by device 112 (FIG. 1A) to form a wireless connection in a P2P group (e.g., a persistent group including devices 111 and 112 in FIG. 1A) and if device 111 has no available interface (e.g., extra virtual interface) to form such a wireless connection when it already has established connection 131 (FIG. 1B), device 111 may dynamically switch to a controller role and form the new P2P group including devices 111 and 112. In this example, device 111 may reform the previous P2P wireless connection between devices 111 and 112 seamlessly without additional actions, such as without interactions from the user. Device 111 may also inform device 113, device 114, or both, to join the new P2P group. Device 111 may use current connectivity (e.g., secured P2P wireless connections) in wireless network 102 to provision parameters to form the new P2P group. Device 113, device 114, or both may join the new group as clients. Alternatively, device 113, device 114, or both may decline to join the new group.

One or more of devices 111, 112, 113, 114 in FIG. 1A and FIG. 1B may include devices and operations described below with reference to FIG. 2A through FIG. 4.

Figure 2A:
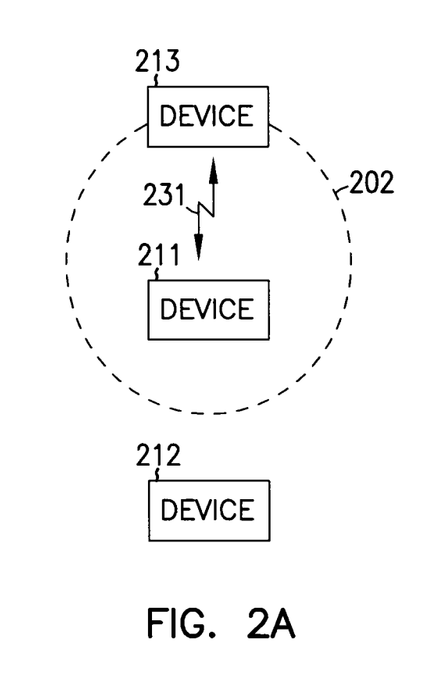
FIG. 2A shows a block diagram of a group of two devices wirelessly connected directly to each other in a wireless network and an additional device not connected to any of the two devices in the group, according to some embodiments described herein.

FIG. 2A shows a block diagram of a group of devices 211 and 213 wirelessly connected directly to each other in a wireless network 202 and a device 212 not connected to devices 211 and 213. Wireless network 202 may include a wireless network similar to or identical to those of wireless networks 101 and 102 of FIG. 1A and FIG. 1B, respectively. As shown in FIG. 2A, devices 211 and 213 may have already established a connection (e.g., P2P wireless connection) 231 in wireless network 202. Device 212 may not have established a connection (e.g., a P2P wireless connection) with neither device 211 nor device 213.

Device 212, however, may have connected to device 211 (e.g., previously connected to device 211 in a persistent group) through a P2P wireless connection before device 211 wirelessly connected to device 213. For example, devices 211 and 212 may correspond to devices 111 and 112, respectively, of FIG. 1A, such that before devices 211 and 213 establish connection 231 (FIG. 2A), devices 211 and 212 may have wirelessly connected to each other in a persistent group through a P2P wireless connection, such as connection 121 (FIG. 1A).

Figure 2B:
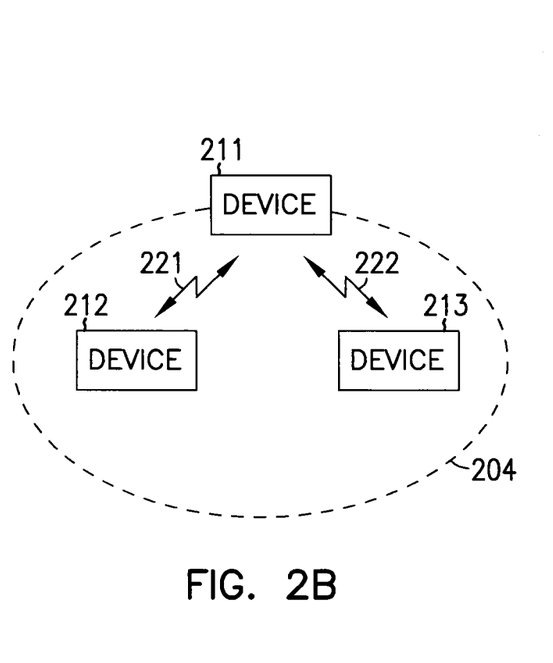
FIG. 2B shows a block diagram of the devices of FIG. 2A after all of these are wirelessly connected to each other in a new group in a new wireless network different from the wireless network of FIG. 2A, according to some embodiments described herein.
Figure 2C:
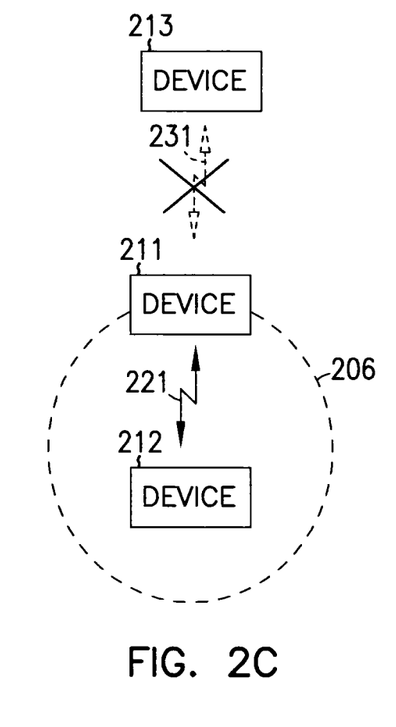
FIG. 2C shows a block diagram of the devices of FIG. 2A where a new group including fewer than all of the devices is formed in a new wireless network different from the wireless network of FIG. 2A, according to some embodiments described herein.

The following description with reference to FIG. 2A, FIG. 2B, FIG. 2C, and FIG. 3 describes communication between devices 211, 212, and 213 when device 212 (FIG. 2A) attempts to form (e.g., reform) a P2P wireless connection between devices 211 and 212. FIG. 2B and FIG. 2C show two different connectivity examples after device 212 attempts to form (e.g., reform) a P2P wireless connection between devices 211 and 212.

FIG. 2B shows a block diagram of devices 211, 212, and 213 after they are wirelessly connected to each other in a new group in a wireless network 204 different from wireless network 202 of FIG. 2A.

FIG. 2C shows a block diagram of devices 211, 212, and 213 where only devices 211 and 212 are wirelessly connected to each other in a new group in a wireless network 206. Device 213 may not join the new group including devices 211 and 212 after the new group is formed.

Each of wireless networks 202, 204, and 206 may include an IEEE 802.11 wireless network and each of devices 211, 212, and 213 may include a Wi-Fi enabled device, such that they may communicate with each other according to IEEE 802.11 standards. For example, each of wireless networks 202, 204, and 206 may include a Wi-Fi Direct network and devices 211, 212, and 213 may communicate with each other according to Wi-Fi Direct specification.

Figure 3:
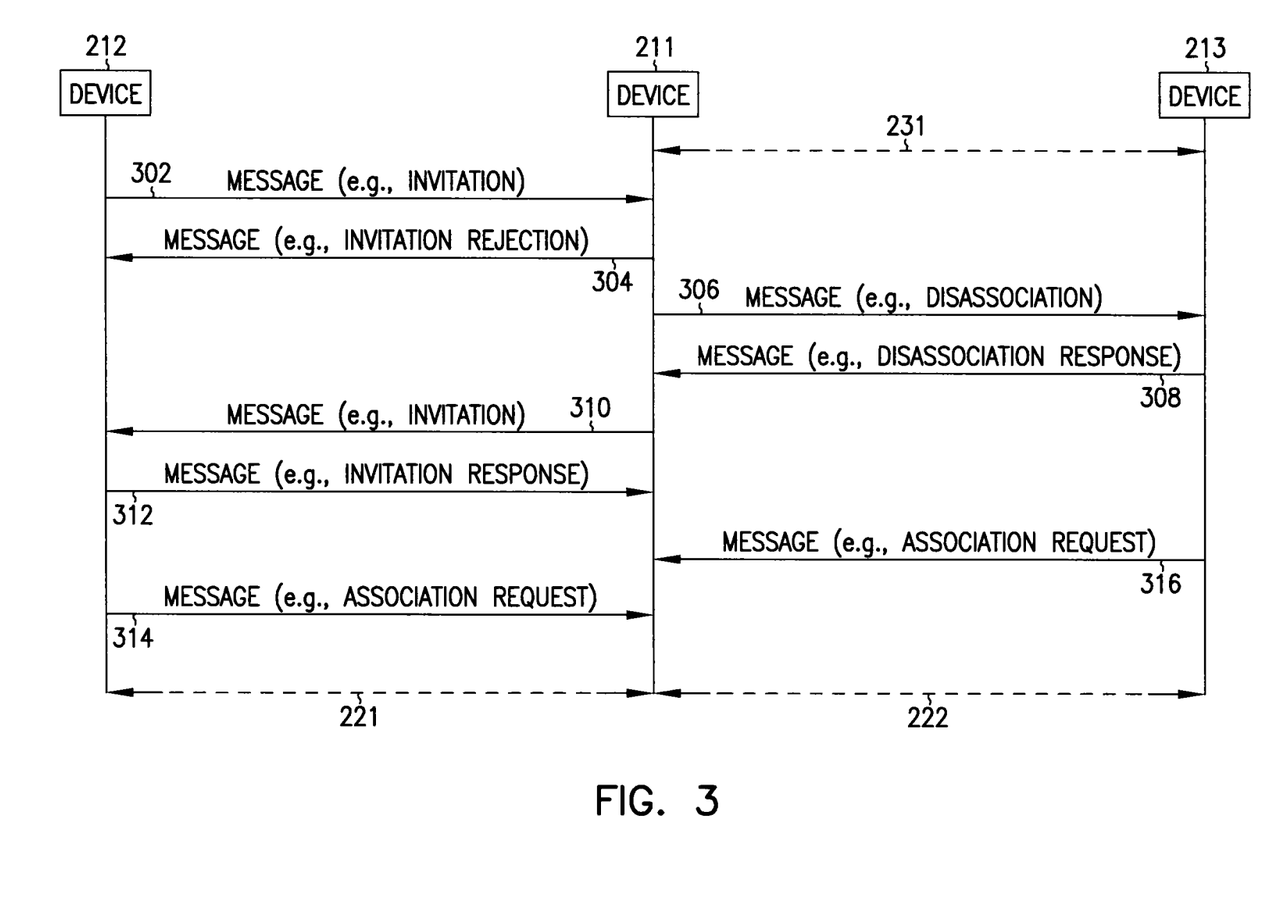
FIG. 3 is communication flow diagram showing an example communication between the devices of FIG. 2A, FIG. 2B, and FIG. 2C, according to some embodiments described herein

FIG. 3 is a communication flow diagram showing an example communication between the devices 211, 212, and 213 of FIG. 2A, FIG. 2B, and FIG. 2C. In FIG. 3, connection 231 corresponds to connection 231 of FIG. 2A.

As shown in FIG. 3, device 212 may send a message 302 to device 211. Device 211 may already have established a P2P wireless connection with device 213 through connection 231 before message 302 is sent by device 212.

Message 302 may include an invitation request frame to form a wireless connection (e.g., a persistent P2P wireless connection) directly between devices 211 and 212. In responding to message 302 received from device 212, device 211 may send a message 304 to device 211.

Message 304 may include an invitation response frame. For example, device 211 may be a client and device 213 may be a controller in wireless network 202. Thus, in FIG. 3, message 304 sent by device 211 may include information to reject the invitation to form a P2P wireless connection between device 211 and 212 if device 211 has no available interface (e.g., virtual interface) to form such a connection. This situation (no available interface) may occur if device 211 supports only one interface for wireless communication and it receives message 302 (e.g., invitation request frame) from device 212 when device 211 has already established a P2P wireless connection (e.g., connection 231 in FIG. 2A) with device 213.

Message 304 from device 211 may also include information to inform device 212 that device 211 will send an invitation request, at a later time, to form a P2P wireless connection (e.g., a previous P2P wireless connection in a persistent group) between devices 211 and 212. The information included in message 304 may include, for example, a reason code, such as "sorry, cannot except your invitation now, I will invite you later" or something similar. As described above, message 304 may include an invitation response frame. Here, the reason code in message 304 may include one or more bits in a field of a structure (e.g., data structure) of such invitation response frame.

In FIG. 3, device 211 may send a message 306 to device 213 after device 211 exchanges messages 302 and 304 with device 212. Message 306 may include information (e.g., a disassociation request frame) to inform device 213 of terminating (e.g., disassociating) connection 231 between devices 211 and 213.

Message 306 may also include information informing device 213 of a reason for terminating connection 231 between devices 211 and 213 and information informing the device 213 to wirelessly connect to device 211 in a new group (e.g., new P2P group) in a wireless network different from a group (e.g., P2P group) including devices 211 and 213 in wireless network 202. For example, the information included in message 306 may include a disassociation reason code, such as "please join me in a new group" or something similar. As described above, message 306 may include information such as a disassociation request frame. Here, the disassociation reason code in message 306 may include one or more bits in a field of a structure (e.g., data structure) of such disassociation request frame.

Message 306 may also include information requesting device 213 to pass the controller role (e.g., group owner role) to device 211.

The information included in message 306 from device 211 to device 213 may include information of a new group that device 211 may form, such as a new SSID, a new BSSID, a new PSK, and a new channel. These new SSID, BSSID, PSK, and channel may be the same as the SSID, the BSSID, the PSK, and the channel, respectively, of a P2P wireless connection of a group (e.g., persistent group) formed by device 211 and 212 (FIG. 2A) before devices 211 and 213 established connection 231. As described above, message 306 may include information such as a disassociation request frame. Here, the new SSID, new BSSID, new PSK, and new channel in message 306 may include bits in one or more fields of a structure (e.g., data structure) of such invitation response frame.

At least one of the new SSID, new BSSID, new PSK, and new channel included in message 306 may be different from a respective SSID, BSSID, PSK, and channel of the group including devices 211 and 213 in wireless network 202 (FIG. 2A).

Wireless network 202 may include a secured wireless network, such that communication between devices 211 and 213 may be protected. For example, wireless network 202 may include an IEEE 802.11 wireless network, such that communication (e.g., messages 306) between devices 211 and 213 may be secured according IEEE 802.11(w) standards. Thus, information included in message 306 (e.g., provisioning information including SSID, BSSID, PSK, and channel) related to the new group may be protected in the current connectivity (e.g., connection 213) of wireless network 202.

As shown in FIG. 3, device 213 may send a message 308 to device 211 in response to message 306 from device 211. Message 308 may include information (e.g., a disassociation response frame) to indicate whether device 213 agrees to pass the controller role from device 213 to device 211. If device 213 agrees to pass the controller role to device 211, message 308 from device 213 may include information such as an internet protocol (IP) address and other information associated with a dynamic host configuration protocol (DHCP). If device 213 does not agree to pass the controller role to device 211, device 213 may include a rejection in message 308 to device 211 in response to message 306 from device 211. Alternatively, if device 213 rejects message 306 from device 211, device 213 may choose to do nothing after it receives message 306 from device 211. For example, device 213 may not send a message, such as message 308, to device 211 after device 213 receives message 306 from device 211.

After exchanging messages 302, 304, and 306 with devices 212 and 213, device 211 may switch (e.g., automatically switch) from one mode to another (e.g., from a client mode to a controller mode) to operate as a controller in a new group in a new wireless network. For example, device 211 may switch from a client mode to a controller mode to operate as a controller in the new group regardless of whether or not device 211 receives message 308 from device 213. Device 211 may start to beacon after it switches modes, such as switching from a client mode to a controller mode. The beacon may include information of the new group (e.g., new SSID, new BSSID, and new channel).

As shown in FIG. 3, device 211 may send a message 310 to device 212. Message 310 may include an invitation request frame to invite device 212 to form a wireless connection (e.g., a previous P2P wireless connection in a persistent group) between devices 211 and 212 in a new wireless network, such as wireless network 204 (FIG. 2B).

Device 212 may send a message 312 to device 211 in response to message 310 from device 211. Message 312 may include an invitation response frame. Then, device 212 may send a message 314 to device 211. Message 314 may include an association request frame to establish a P2P wireless connection between devices 211 and 212. As shown in FIG. 2B, devices 211 and 212 may wirelessly connected to each other through a connection (e.g., P2P wireless connection) 221 in wireless network 204.

Device 213 may be configured to decide whether to join wireless network 204 or not to join network 204 after device 213 receives message 306 (e.g., a disassociation request frame), as described above.

If device 213 decides to join wireless network 204, device 213 may send a message 316 to device 211. Message 316 may include an association request frame to form a P2P wireless connection with device 211 in the new group. The association request frame included in message 316 may use provisioning information (e.g., new SSID, new BSSID, and new channel) included in message 306 that device 213 previously received from device 211. As shown in FIG. 2B, devices 211 and 213 may be wirelessly connected to each other through a connection (e.g., P2P wireless connection) 222 in wireless network 204. In FIG. 3, connection 231 between devices 211 and 213 may be terminated if devices 211 and 213 are wirelessly connected to each other through connection 222.

If device 213 decides not to join wireless network 204, device 213 may not send a message 316 to device 211. Thus, the new wireless network formed by device 211 (e.g., as a controller) may not include device 213. FIG. 2C shows such a new wireless network as wireless network 206, where connection 231 (also in FIG. 2A) between devices 211 and 213 may be terminated (e.g., disassociated), as indicated by the "x" mark. In FIG. 3, neither connection 231 nor connection 222 between devices 211 and 213 may exist if device 213 decides not to join wireless network 206 (FIG. 2C). Device 213, however, may join network 206 at a later time.

In FIG. 3 device 211 may receive messages 314 and 316 in any order. For example, device 212 may send message 314 before device 213 sends message 316. In another example, device 212 may send message 314 after device 213 sends message 316. Thus, device 211 may receive message 314 before or after it receives message 316.

Figure 4:
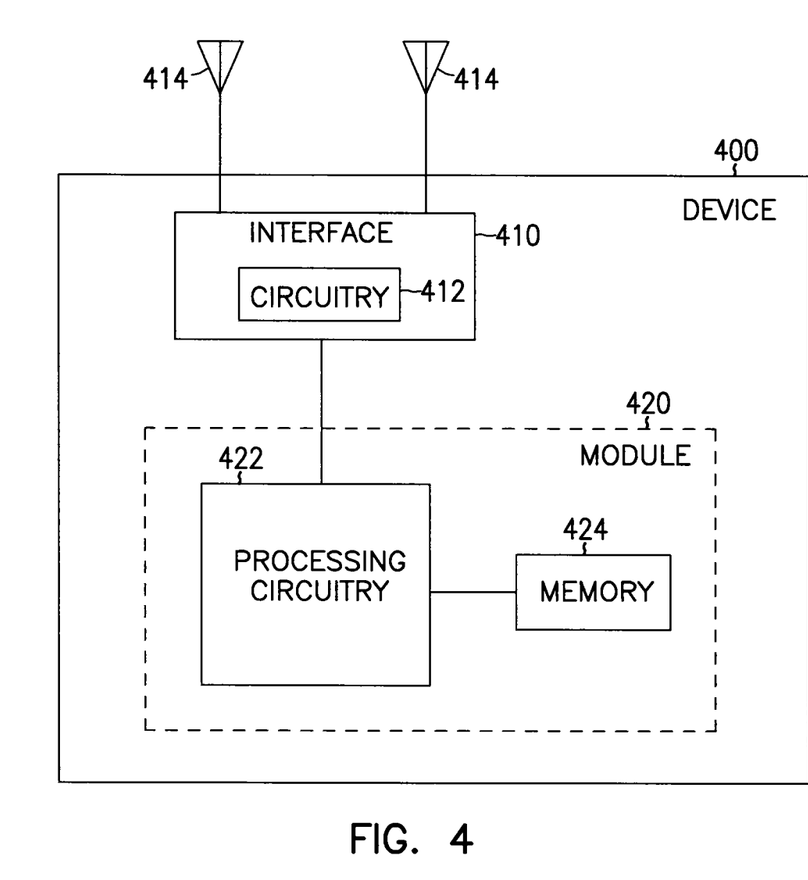
FIG. 4 shows a block diagram of a device including an interface and a module configured to perform wireless communication, according to some embodiments described herein.

FIG. 4 shows a block diagram of device 400 including an interface 410 and a module 420. Device 400 may include devices described above with reference to FIG. 1A, FIG. 1B, FIG. 2A, FIG. 2B, FIG. 2C, and FIG. 3. Thus, device 400 may include a wireless communication device that may be configured to perform operations as a client or a controller in a P2P wireless network similar to or identical to those described above with reference to FIG. 1A, FIG. 1B, FIG. 2A, FIG. 2B, FIG. 2C, and FIG. 3. For example, device 400 may include both a controller and client functionality to support different modes (e.g., a controller mode and a client mode). Thus, device 400 may be a controller in one P2P group at one time and a client in another P2P group at another time.

In FIG. 4, interface 410 may include circuitry 412 and antennas 414 to wirelessly exchange (e.g., send and receive) messages with other devices (not shown in FIG. 4). For example, circuitry 412 may include a receiver circuit (not shown in FIG. 4) to receive messages and a transmitter circuit (not shown in FIG. 4) to transmit messages. Such receiver and transmitter circuits may be combined in a transceiver in circuitry 412. Interface 410 may be configured to operate in IEEE 802.11 wireless networks, such that interface 410 may send and receive messages according to IEEE 802.11 standards.

Antennas 414 may include one or more directional or omnidirectional antennas. For example, antennas 414 may include dipole antennas, monopole antennas, patch antennas, loop antennas, microstrip antennas or other types of antennas suitable for transmission of radio frequency (RF) signals. In some embodiments of device 400, instead of two or more antennas, a single antenna with multiple apertures may be used. In such embodiments, each aperture may be considered a separate antenna.

Module 420 may include processing circuitry 422 and a memory 424. Processing circuitry 422 may include a single processor or multiple processors. The processor or processors may include one or more general purpose processors, one or more application-specific integrated circuits (ASICs), or other types of processor. Processing circuitry 422 may configure messages for transmission by interface 410 (e.g., by a transceiver in circuitry 412) to other devices. Processing circuitry 422 may be configured to communicate with the interface 410 to wirelessly exchange messages with other devices.

Memory 424 may include volatile memory, non-volatile memory, or a combination of both. Memory 424 may contain instructions (e.g., firmware programs, software programs, or a combination of both), which when executed by processing circuitry 422 result in device 400 performing operations. Such operations may include operations of a controller, a client, or both, in a P2P wireless network as described above with reference to FIG. 1A through FIG. 3.

Device 400 in FIG. 4 may be configured to communicate with a single type of network or with multiple types of networks. For example, device 400 may include a wireless communication device (WCD) and may be configured to communicate with Wi-Fi networks, cellular networks, or both Wi-Fi networks and cellular networks.

Although device 400 is illustrated as having several separate functional elements, one or more of the functional elements may be combined and may be implemented by combinations of software-configured elements, such as processing elements including digital signal processors (DSPs), and/or other hardware elements.

The embodiment associated with apparatuses (e.g., devices 111, 112, 113, 114, 211, 212, and 213, and 400) and methods (e.g., operations associated with devices 111, 112, 113, 114, 211, 212, 213, and 400) may be implemented in one or a combination of hardware, firmware and software. These embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, one or more processors and may be configured with instructions stored on a computer-readable storage device to implement the various operations described herein.

The illustrations of apparatuses (e.g., devices 111, 112, 113, 114, 211, 212, 213, and 400) and methods (e.g., operations associated with devices 111, 112, 113, 114, 211, 212, and 213, and 400) are intended to provide a general understanding of the structure of various embodiments and are not intended to provide a complete description of all the elements and features of apparatuses that might make use of the structures described herein.

Devices 111, 112, 113, 114, 211, 212, 213, and 400 may be included in apparatuses (e.g., electronic circuitry) such as high-speed computers, communication and signal processing circuitry, single or multi-processor modules, single or multiple embedded processors, multi-core processors, message information switches, and application-specific modules including multilayer, multi-chip modules. Such apparatuses may further be included as sub-components within a variety of other apparatuses (e.g., electronic systems), such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 5) players), vehicles, medical devices (e.g., heart monitor, blood pressure monitor, etc.), set top boxes, and others.

The embodiments described above with reference to FIG. 1A through FIG. 4 include an apparatus having WCD and methods for the WCD to wirelessly exchange messages with other devices. In some embodiments, such WCD may send a message to reject an invitation to form a P2P wireless connection between the WCD and a first device if the invitation is received by the WCD when the WCD has already established a P2P wireless connection with a second device. Other embodiments including additional apparatuses and methods are described.

The above description and the drawings illustrate some embodiments to enable those skilled in the art to practice the embodiments of the inventions. Other embodiments may incorporate structural, logical, electrical, process, and other changes. Examples merely typify possible variations. Portions and features of some embodiments may be included in, or substituted for, those of others. Many other embodiments will be apparent to those of skill in the art upon reading and understanding the above description. Therefore, the scope of various embodiments of the invention is determined by the appended claims, along with the full range of equivalents to which such claims are entitled.

The Abstract is provided to comply with 37 C.F.R. §1.72(b) requiring an abstract that will allow the reader to quickly ascertain the nature and gist of the technical disclosure. The Abstract is submitted with the understanding that it will not be used to interpret or limit the scope or meaning of the claims.

What is claimed is:

1. A method comprising:
    receiving, at a first device, a first message from a second device while the first device is connected to a third device in a peer-to-peer (P2P) wireless network including the first device and the third device, the first message including an invitation inviting the first device to form a wireless network including the first device and the second device;
    sending, from the first device, a second message to the second device, the second message to the second device including a reason to reject the invitation to form the wireless network between the first device and the second device, wherein the reason to reject expressly includes information that the first device will send an invitation to the second device to wirelessly connect to the first device and that comprises one or more bits in a field of a data structure of the second message; and
    sending, from the first device, a third message to the third device that is a termination message while the first device and the third device connected, and the third message includes a reason to terminate that includes a reason code expressly indicating an invitation to join the device in a new group and that comprises one or more bits in a field of a data structure of the third message.

2. The method of claim 1, wherein the first device is a client in the P2P wireless network including the first device and the third device.

3. The method of claim 2, wherein the first device includes no available interface to form a wireless connection with the second device while the first device is connected to the third device in the P2P wireless network including the first device and the third device.

4. The method of claim 1, further comprising:
    sending, from the first device, information associated with a new wireless network to the third device, the new wireless network being different from the P2P wireless network including the first device and the third device, the information associated with the new wireless network including a service set identifier (SSID), a basic service set identifier (BSSID), a pre-shared key (PSK), and a channel.

5. The method of claim 4, further comprising:
    receiving a message from the third device, the message including dynamic host configuration protocol (DHCP) information.

6. The method of claim 5, wherein information associated with the new wireless network and the DHCP information are sent through a P2P wireless connection in the P2P wireless network including the first device and the third device.

7. The method of claim 5, wherein each of the P2P wireless network including the first device and the third device and the wireless network including the first device and the second device includes a Wi-Fi Direct network.

8. A wireless communication device (WCD) comprising:
    an interface; and
    processing circuitry configured to communicate with the interface to:
        send a first message to a first device to reject an invitation to form a peer-to-peer (P2P) wireless connection between the WCD and the first device if the invitation is received by the WCD when the WCD has already established a P2P wireless connection with a second device; and
        send a second message to the second device if the WCD receives the invitation to form the P2P wireless connection between the WCD and the first device when the WCD has already established P2P wireless connection with the second device;
    wherein:
        the second message to the second device includes information to inform the second device of:
            terminating a wireless connection between WCD and the second device in a wireless network including the WCD and the second device; and
            a reason to terminate the wireless connection between WCD and the second device, wherein the reason to terminate includes a reason code expressly indicating an invitation to join the device in a new group and that comprises one or more bits in a field of a data structure of the second message; and
        the first message to the first device includes information to inform the first device of:

a reason to reject the invitation, wherein the reason to reject expressly includes information that the WCD will send an invitation to the first device to wirelessly connect to the WCD and that comprises one or more bits in a field of a data structure of the first message.

9. The WCD of claim 8, wherein the reason to terminate includes information informing the second device to wirelessly connect to the WCD in a new wireless network different from the wireless network including the WCD and the second device.

10. The WCD of claim 9, wherein the information notifying the second device includes a service set identifier (SSID), a bask service set identifier (BSSID), a pre-shared key (PSK), and a channel, and at least one of the SSID, the BSSID, the PSK, and the channel is different from a respective SSID, BSSID, PSK, and channel of the wireless network including the WCD and the second device.

11. The WCD of claim 8, wherein the module is to communicate with the interface to send a message to the second device to agree to pass a controller role to the second device if the WCD is a controller in a wireless network including the WCD and the second device, if the WCD receives a request terminating a wireless connection between the WCD and the second device in the wireless network including the WCD and the second device, and if the WCD agrees to pass the controller role to the second device.

12. The WCD of claim 11, wherein the message to the second device includes dynamic host configuration protocol (DHCP) information.

13. The WCD of claim 8, wherein the WCD is configured to operate in a client mode in a wireless network including the WCD and the second device.

14. The WCD of claim 8, wherein the module is to communicate with the interface to send a message to the second device rejecting the request terminating the wireless connection between the WCD and the second device, if the WCD is a controller in a wireless network including the WCD and the second device, if the WCD receives a request terminating a wireless connection between the WCD and the second device in the wireless network including the WCD and the second device, and if the WCD does not agree to pass the controller role to the second device.

15. The WCD of claim 8 wherein the module includes a processor.

16. The WCD of claim 15, wherein the interface includes a transceiver to transmit the message according to IEEE 802.11 standards.

17. The WCD of claim 15, wherein the interface includes at least one antenna.

18. A wireless communication device (WCD) comprising:
an interface; and
processing circuitry configured to communicate with the interface to:
send a first message to a first device to inform the device of a reason to terminate a peer-to-peer (P2P) wireless connection between the WCD and the device:
if the P2P wireless connection is established between the WCD and the first device, and
if the WCD receives an invitation from a second device to form a new P2P group different from a P2P group including the WCD and the device;
wherein the reason to terminate includes a reason code expressly indicating an invitation to join the device in a new group; and
send a second message to the second device that includes information to inform the second device of a reason to reject the invitation, wherein the reason to reject expressly includes information that the WCD will send an invitation to the second device to wirelessly connect to the WCD and that comprises one or more bits in a field of a data structure of the second message.

19. The WCD of claim 18, wherein the message includes information of the new P2P group different from the P2P group including the WCD and the device.

20. The WCD of claim 19, wherein the information of the new P2P group includes a service set identifier (SSID), a basic service set identifier (BSSID), a pre-shared key (PSK), and a channel, and at least one of the SSID, the BSSID, the PSK, and the channel is different from a respective SSID, BSSID, PSK, and channel of the P2P group including the WCD and the device.

21. The WCD of claim 20, wherein the interface includes circuitry to send the message according to IEEE 802.11 standards.

* * * * *

UNITED STATES PATENT AND TRADEMARK OFFICE
CERTIFICATE OF CORRECTION

PATENT NO. : 9,681,476 B2
APPLICATION NO. : 13/997051
DATED : June 13, 2017
INVENTOR(S) : Qi et al.

It is certified that error appears in the above-identified patent and that said Letters Patent is hereby corrected as shown below:

On the Title Page

On page 2, in Column 2, under "Foreign Patent Documents", Line 1, delete "102011004002" and insert --1020110040025-- therefor In the Claims In Column 10, Line 3, in Claim 1, after "device", insert --are--

In Column 11, Line 44, in Claim 15, delete "claim 8" and insert --claim 8,-- therefor Signed and Sealed this
Tenth Day of April, 2018

Andrei Iancu
*Director of the United States Patent and Trademark Office*